H. B. KRAUT.
PUNCHING AND SHEARING MACHINE.
APPLICATION FILED SEPT. 3, 1909.

1,035,092.

Patented Aug. 6, 1912.
5 SHEETS—SHEET 1.

Witnesses:
Geo. C. Davison
W. Goldberger

Inventor:
Hans B. Kraut
By William K. Hall
Attys.

UNITED STATES PATENT OFFICE.

HANS B. KRAUT, OF CHICAGO, ILLINOIS, ASSIGNOR, BY MESNE ASSIGNMENTS, TO JOSEPH T. RYERSON & SON, A CORPORATION OF ILLINOIS.

PUNCHING AND SHEARING MACHINE.

1,035,092.

Specification of Letters Patent.

Patented Aug. 6, 1912.

Application filed September 3, 1909. Serial No. 516,010.

*To all whom it may concern:*

Be it known that I, HANS B. KRAUT, a subject of the Emperor of Germany, and a resident of Chicago, in the county of Cook and State of Illinois, have invented certain new and useful Improvements in Punching and Shearing Machines; and I do hereby declare that the following is a full, clear, and exact description thereof, reference being had to the accompanying drawings, and to the letters of reference marked thereon, which form a part of this specification.

This invention relates to improvements in punching and shearing machines, certain of the improvements being applicable to machines for both punching and shearing metal, while other of the improvements are more specifically adapted to punching machines.

Among the objects of the invention is to provide an improved frame for a punching or shearing machine of that class embracing frame plates that are suitably bolted or riveted together with filling pieces between them. This phase of my invention embraces as one of its principal features a cast metal throat piece which fills the space between the side plates of the machine frame and is attached rigidly to said side plates by through bolts or rivets and arranged to receive, in conjunction with said side plates, the punching or shearing stresses brought on the frame. Said cast metal throat piece, which may be made of cast or semi-steel, and is of depth required for the work or material to be operated upon, greatly strengthens and reinforces the frame against bending and springing stresses, and avoids such movement of the frame parts, due to the elasticity of the material, as will prevent the operative mechanism of the tool actuating devices getting out of alinement. Such throat piece may be provided with integral extensions arranged to support the die or lower blade support of the punching or shearing machine and partially supports the tool head of the machine. A further feature of this phase of the invention, in its use in a deep throated frame, resides in the provision of bearing lugs on the throat piece to constitute intermediate supports for the long drive shaft used in such a machine.

Another object of the invention is to provide means for centering the tool preparatory to the power actuating movement of the tool, thereby insuring that the tool shall operate on the material accurately at the points desired. The construction embraced in this phase of the invention may reside in the provision of a tool carriage (by which is meant that part of the tool head which carries the tool and through which the power is impressed on the tool to force it to its work) which is movable toward the material or stock independently of or relatively to the tool actuating means, by which the shearing or punching impress is given to the tool, so as to center the work, the centering movement of the carriage being followed by its actuating movement to apply power to the tool required to effect the desired operation of the tool on the material. This phase of my invention may be embraced in a tool carriage which is movable both by hand and foot power to center the tool.

A further object of the invention is to provide novel means for stripping the tool from the material after it has been impressed or forced into or through the material. This phase of my invention may be embraced in the tool centering phase of the construction referred to, embracing the relatively movable tool actuating pitman or plunger and tool carriage, and may also embrace means for positively connecting the pitman or plunger head with the carriage at the end of the working throw of the carriage so that as said pitman or said plunger is retracted the carriage is positively retracted so as to positively strip the tool from the material. Combined with such an arrangement may be employed a counter-balancing device, embracing a spring or counterweight, to counter-balance the weight of the carriage; and when operating on light material such counter-balancing device may be relied on to effect the stripping operation.

A still further object of the invention is to provide means, located at the tool actuating head, for clutching the tool actuating pitman to and disconnecting it from the drive shaft, and to provide convenient and effective means for producing this result either by hand or foot power, and to further provide means for operating the clutch actuating device so that the tool may be operated continuously, once in each cycle of movement of the machine.

Other objects of the invention are to improve, simplify and increase the efficiency of machines of this character, and the invention consists in the matters hereinafter set forth and more particularly pointed out in the appended claims.

I have herein shown the several improvements embodying my invention as applied to a punching machine, but, as before stated, certain of the features of the invention are applicable as well to shearing and other machines for cutting and shearing metal.

Figure 1:
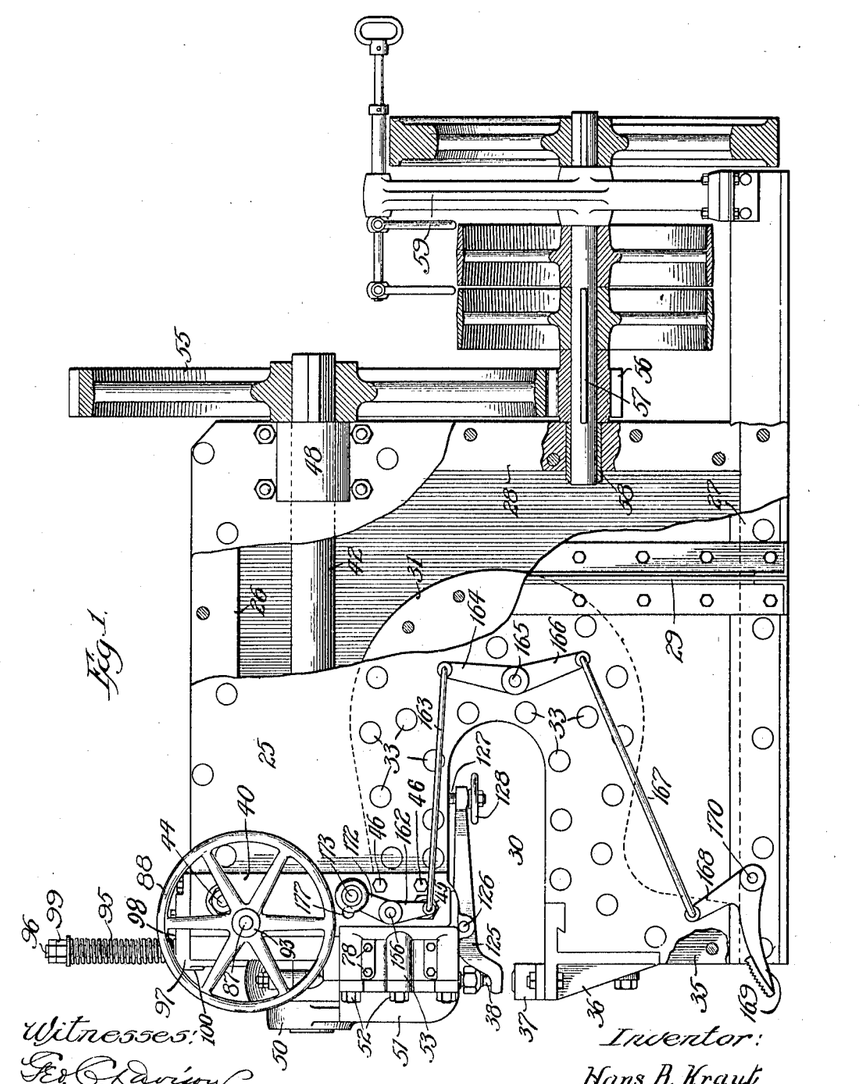
Figure 1 is a side elevation of a punching machine embodying my improvements, portions being broken away to illustrate more clearly the features of improvement relating to the machine frame.
Figures 2, 3, 6, 10:
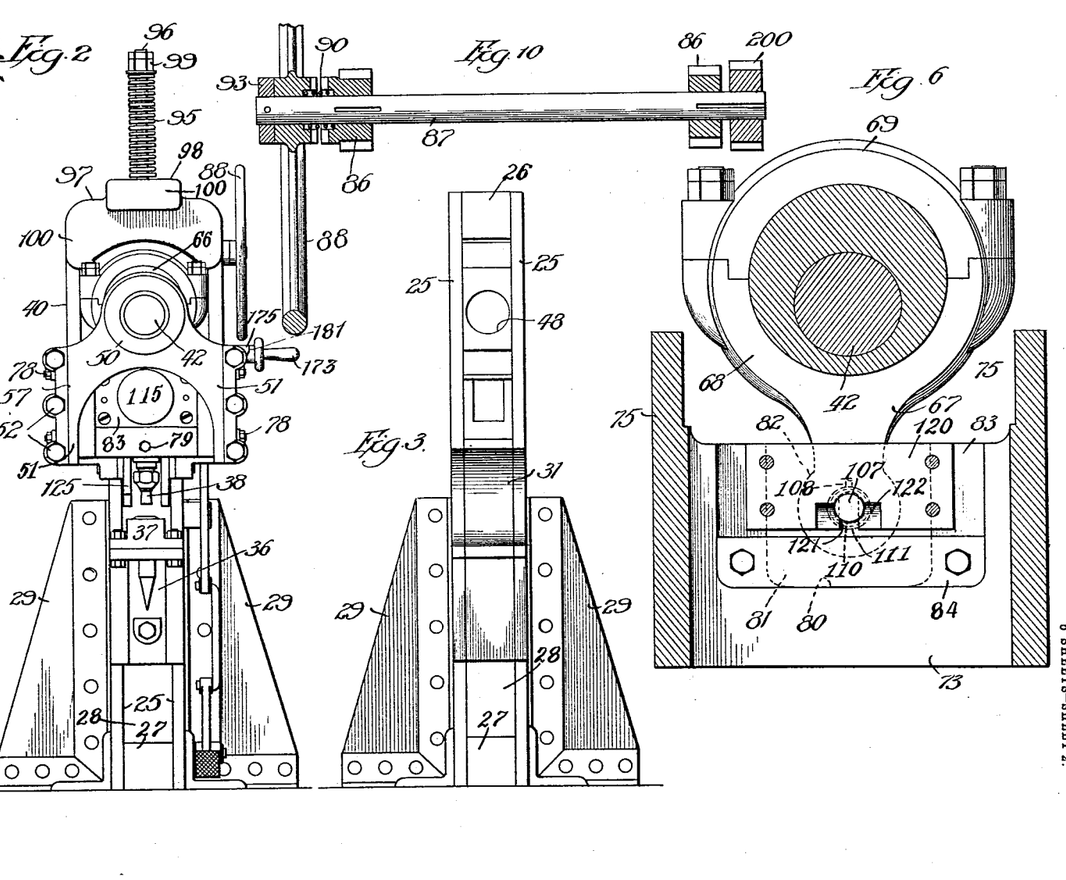
Fig. 2 is a front elevation thereof.
Fig. 3 is a front elevation of the frame stripped of the operating mechanism.
Fig. 6 is a fragmentary, vertical section on the line 6—6 of Fig. 5.
Fig. 10 is a detail of the pinion mechanism for centering the carriage.

First referring to the general construction of the frame of the machine, it will be observed that it embraces, in general terms, two heavy side plates 25, 25 and filler bars 26, 27 and 28, arranged between the upper and lower and the rear marginal parts of said side plates and bolted or riveted to the side plates to reinforce said plates at the margins thereof. Stiffening braces 29, 29 are applied to the outer sides of the frame, as shown in Figs. 1, 2 and 3, which may be built up of angle bars and plates and attached to the side plates in any suitable manner. The side plates 25 are cut away at the front side of the machine to provide a throat opening 30 of suitable depth to receive the material operated upon.

One of the features of my invention resides in the provision of a cast metal throat piece 31, made of general horse shoe form, the inner margins of the throat piece conforming to the inner margins of the cut away side plates. The said throat piece is made of a relatively stiff cast metal, being preferably made of semi-steel. It entirely fills the space between the side plates, and the throat piece and plates are rigidly secured together, as by means of rivets or bolts 33, 33, extending through the throat piece and plates. An advantage of a cast metal throat piece of this character, as compared to a laminated or built up throat piece, is that the frame is thus made exceedingly rigid and is well able to withstand the stresses brought thereon during the application of the tool to the material without objectionable springing or bending the frame in a manner to throw the reciprocating tool and its coöperating parts out of alinement.

The lower leg or member of the horse shoe shaped throat piece is provided at its front end with a downward extension 35 which is located between and is bolted or riveted to the forward margins of the side plates of the frame and extends downwardly to the lower filler bar 27. To the forward end of said lower leg and the said depending portion 35 thereof is bolted or otherwise fixed the support 36 of the die 37 with which the tool (the punch 38 herein shown) coöperates.

Figures 5, 11, 12:
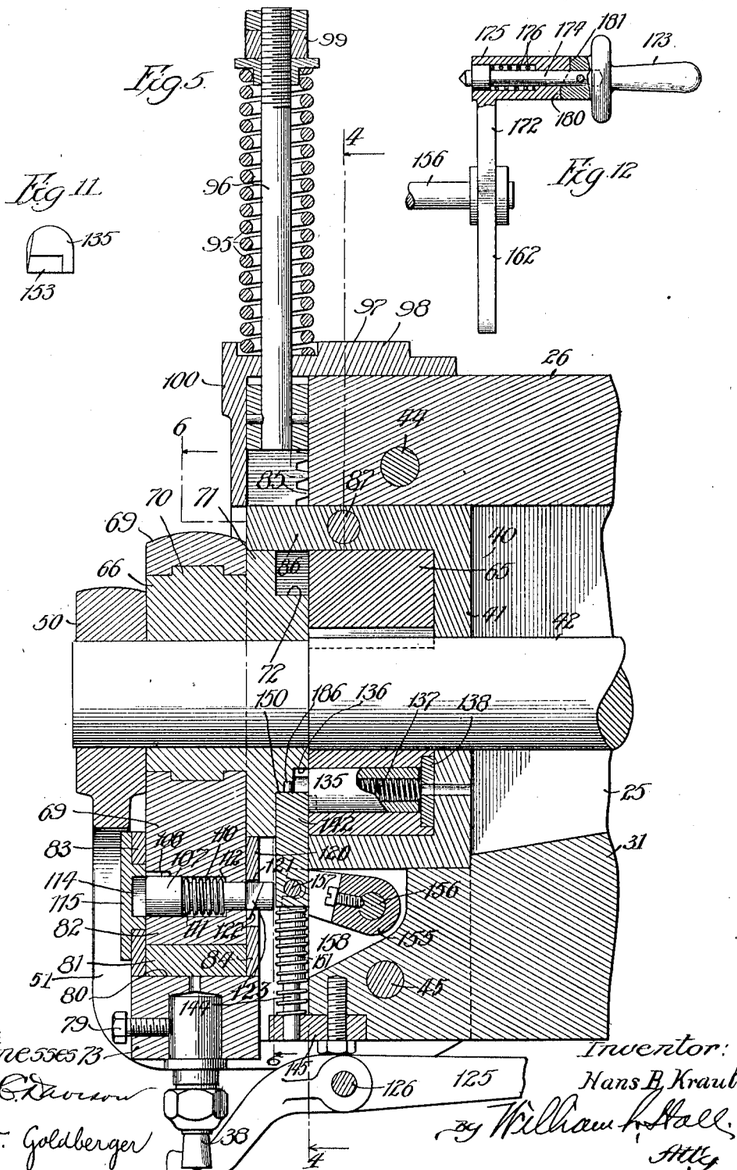
Fig. 5 is a vertical section on the line 5—5 of Fig. 4.
Fig. 11 is an end view of the clutch pin forming part of the mechanism for clutching the drive shaft to the tool actuating pitman eccentric.
Fig. 12 is a detail of the device for locking the clutch shoe out of its operating position.

The frame further comprises, as another fixed or stationary part thereof, a tool head designated as a whole by 40 of irregular contour, the parts or members of which will hereinafter more fully appear. The same frame embraces a chambered-like portion 41 (Fig. 5) which receives a portion of the clutch mechanism by which the tool operating pitman or plunger is connected with the drive shaft 42. It is provided at its upper end with laterally separated lugs 43, 43 which embrace and are attached, as by the bolt 44, to the forward extension or end of the upper filler bar 26 of the frame, which bar extends beyond the front margins of the frame plates 25, 25, said front margins of the frame plates, above the throat piece 31, terminating in rear of the front margins of said plates below said throat piece, as more clearly indicated in Fig. 1. The lower end of the tool head is bolted or rigidly fixed to the forward end of the upper leg of the throat piece, as by means of the bolts and rivets 45, 46, the head being slotted at its lower end and arranged to straddle the forward end of the upper member of the throat piece and to be bolted thereto as indicated in Fig. 5.

The drive shaft 42 is arranged horizontally in the upper part of the machine frame and extends from front to rear of the frame. It is rotatively mounted at its rear end in a bearing block 48 which is suitably supported at the rear margins of the frame plates and at its front end in a bearing bracket 50 at the front side of the frame. As herein shown the front end of the shaft is reduced to engage a reduced bearing opening in said bracket, and the bracket is provided with downwardly extending arms 51, 51 (Fig. 2) that are fixed, as by means of the bolts 52, 52, to lateral lugged flanges 53 of the tool head. Fixed to the rear end of the drive shaft is a large gear wheel 55 which meshes with a pinion 56 that is in turn fixed to a pulley shaft 57. Said pulley shaft is mounted in a bushing 48 carried by the rear frame filler bar 28 and in a standard 59 in rear of the frame. Said shaft carries tight and loose pulleys and a balance wheel, as common in this type of drive mechanisms, through which power is applied to operate the machine. Obviously the shaft may be motor driven and otherwise connected to its source of power.

Figure 7:
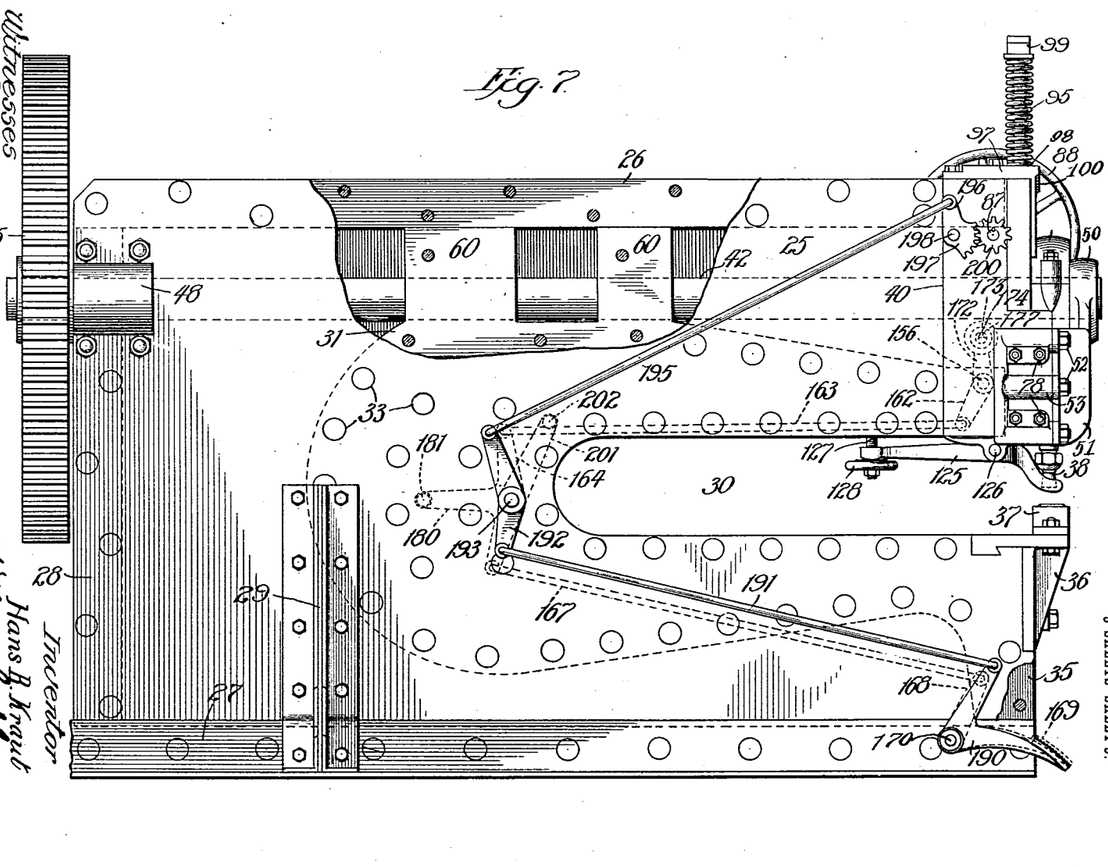
Fig. 7 is a side elevation of a deeper throated machine, and illustrating also different ways of operating the centering and clutching devices.

In the deep throat machine shown in Fig. 7 the upper member of the throat piece 31 is provided with one or more bearing lugs 60, 60 which support the longer shaft 42 between the end bearings thereof, thereby avoiding liability of bending the shaft under torsional stress.

Referring now to the operative connections between the drive shaft 42 and the tool carriage, hereinafter to be described, which carries the tool or punch 38, and which connections embody features of my invention, the same are made as follows: 65 (Fig. 5) designates a disk that is keyed or otherwise non-rotatively secured to the drive shaft and is contained within the chambered portion 41 of the tool head. 66 designates an eccentric that is loosely mounted on the reduced end of the drive shaft 42, between the bearing 50 and said disk 65, and is adapted to be timely clutched or otherwise connected with said disk 65 so as to rotate therewith. 67 designates a pitman having a strap made of the two parts 68, 69 that surrounds said eccentric and are suitably bolted together as indicated in Fig. 6, said eccentric being provided with a peripheral rib 70 that engages with a complemental groove in the pitman strap to hold the eccentric and strap in proper lateral relation. The eccentric 66 has an integral concentric guide flange 71 which bears against the inner side of the pitman strap, and laterally inside of said guide flange with a concentric hub 72 which coöperates with the clutch device, as will hereinafter more fully appear.

The tool carriage referred to embraces a lower transverse member 73, an upper transverse member 74 and parallel side members 75, the latter of which are suitably guided in vertical ways 76 formed in the tool head. The outer sides of said ways 76 may be formed by adjusting plates 77 which, by means of adjusting studs 78 take up the wear in the members of the carriage and ways. The lower transverse member 73 of the carriage is formed with a socket to receive the shank of the punch, which latter is fixed in place by means of a set screw 79. Said member 73 of the tool carriage is formed on its upper side with an upwardly opening notch 80 which receives a pitman shoe 81 that is loosely fitted over the lower headed end 82 of the operating pitman or plunger, the said shoe being fitted laterally over the headed end of the pitman. The pitman shoe 80 is movable vertically in the notched transverse lower member of the carriage relatively to the carriage. The shoe 81 is held laterally on the headed end of the pitman by means of plates 83, 84 that are bolted or otherwise fixed to the front and rear sides, respectively, of the notched lower member of the carriage, as shown in Fig. 5, the rear plate being made narrower than said notch. The carriage has a vertical freedom of movement relatively to the pitman shoe less than the depth of the back plate 84, thus permitting the carriage to be depressed to center the tool while the pitman head remains engaged with said notch. The carriage may be depressed by being provided near the upper ends of its lateral or side arms 75 with rack teeth 85 adapted to be engaged by pinions 86 fixed on a horizontal transverse shaft 87 that has rotative bearing in the tool head in the manner shown in Fig. 4. Said shaft is provided at one end, the right hand end, with a hand wheel 88 by which it is rotated to lower the carriage when centering the tool. In order to avoid rotating the relatively heavy hand wheel 88 during the subsequent descent of the carriage, under the power stroke of the pitman, and the retreating or upward movement of the carriage (at which time the shaft 87 rotates idly) I may mount the wheel 88 loosely on the shaft and connect it with the adjacent fixed pinion by means of ratchet teeth on the adjacent ends of said pinion and the hub of the wheel. The hub of the wheel is pressed toward said pinion to effect the engagement of said ratchet teeth against the action of a spring 90 which spring normally holds said parts separated so that the shaft may rotate loosely in said wheel hub. The outward sliding movement of the wheel on the shaft is limited by a collar 93 fixed to said shaft. The carriage is counter-balanced by a force tending to hold the same upwardly in contact with the pitman or plunger shoe. Such counter-balancing effect may be effected through a weight or spring. As herein shown a spiral, expansively acting spring 95 is employed, which surrounds a stem 96 which extends upwardly from and is attached at its lower end to the carriage, and through an angle shaped cap piece 97 that is fitted to the upper forward corner of the frame. The spring 95 rests at its lower end on the horizontal member 98 of the cap piece and supports the carriage through the medium of a head 99 on the upper end of said stem. The front vertical member 100 of said cap piece extends downwardly in front of the frame, and between which and the front face of the upper portion of the tool head is formed a guide way for the upper ends of the side members 75 of the carriage. When operating on light materials, the counterbalancing effect of the spring 95, or an equivalent weight, may be sufficient to raise the carriage and strip the tool from the material. When working heavier materials, however, it is preferable to provide means, operated by the retreating movement of the pitman, to positively effect such stripping action of the tool.

Referring now to the construction and arrangement whereby is effected a positive connection between the pitman and the carriage to positively raise the latter in the ascent or retreating movement of the pitman to effect the stripping operation, these parts are made as follows: The pitman head is provided with a transverse, axial opening which reciprocates a pin 107 that is fixed non-rotatively in said opening by means of a stud 108 thereon that enters a slot in said opening, said pin 107 being thus permitted to slide endwise in said pitman head opening. The length of the pin is greater than the width of the pitman head. A spiral expansively acting spring 110 surrounds a reduced portion of said pin 107 and is interposed between a shoulder 111 on the pin and an interior shoulder 112 in the pitman head opening and acts to normally thrust said pin forwardly into an engagement with a notch 114 in the front plate 83 of the carriage. As herein shown this notch is formed in a separate hardened plate 115 that is fixed to said plate 83. When said pin 107 is forced into said notch 114 it provides an interlocking connection between the pitman and carriage which causes the pitman to give positive movement to the carriage. Means are provided for releasing the pin 107 from said notch 114 at or about the upward limit of movement of the pitman and carriage, whereby the carriage is disconnected from the pitman and is free to move downwardly relatively to the pitman to center the tool. The releasing means herein shown comprises a stationary tripping plate 120 that lies flat against the rear flat face of the pitman and is fixed in any suitable manner to the tool head, whereby both the carriage and pitman move relatively to the plate. The plate 120 is provided in line with the pin with a notched portion 121 into which the rear end of the pin 107, which projects rearwardly beyond said pitman, is raised when the pitman and carriage are raised. The tripping plate is provided at the sides of its notch with downwardly and forwardly inclined cam portions 122 and the end portion of the interlocking pin 107 is provided on its opposite sides with notches 123 having inclined rear walls adapted to engage the cam portions 122 of the plate 120. Therefore, when the rear notched end of said pin is raised into engagement with the notched tripping plate, said pin is withdrawn from the socket 114 to effect a disconnection of the pitman from the carriage. The pin is held in its retracted position until the pitman again descends and disengages the tripping plate from said pin. Thus the carriage is free to descend to center the tool, and the pin is again interlocked with the carriage when the pitman reaches the limit of its downward movement, whereby upon the retractive or upward movement of said pitman the carriage and tool are positively moved upwardly therewith.

A forked stripper lever 125 of usual form is pivoted at 126 to the tool head, the tool operating between the fork arms of said lever. Said lever is provided at its rear end with a screw-threaded adjusting stud 127 having a hand wheel 128, the stud acting upwardly against the lower margin of the upper member of the throat piece.

Figures 4, 8, 9:
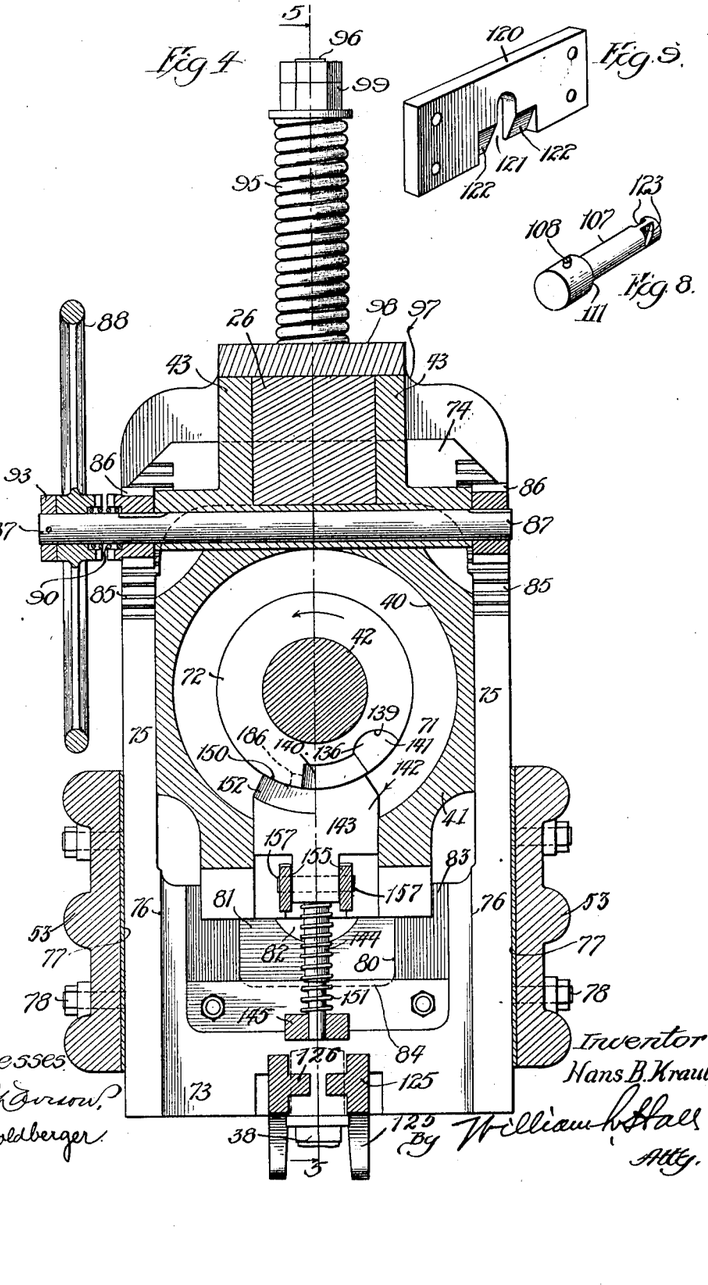
Fig. 4 is a vertical section on the line 4—4 of Fig. 5.
Fig. 8 is a detail of the pin for timely connecting the tool operating pitman with the carriage to effect a positive stripping operation.
Fig. 9 is a detail of a fixed plate for actuating said pin.

Referring now to the mechanism by which the drive shaft 42 is clutched to the pitman eccentric to operate the tool, said parts are made as follows: The disk 65 on the drive shaft is provided at one side of its center with a transverse opening in which is contained and slides endwise a clutch pin 135. The pin is non-rotative in said opening, being herein shown as flattened on its bottom to engage the flattened bottom of said opening. The concentric hub 72 of the pitman actuating eccentric is provided on its inner flat face, near the periphery of said hub, with a socket 136 adapted to receive the end of said clutch pin at certain periods of the operation of the machine. The said clutch pin is adapted to be projected from the disk toward the eccentric hub through the medium of the spiral, expansively acting spring 137 that is contained within an axial recess of said pin and bears at one end against the bottom of said recess, and at its other end against a plate 138 fixed to the rear face of said disk over said opening, said plate being provided with an air vent opening to avoid a vacuum at the rear of said pin. The socket 136 in the eccentric hub which receives the clutch pin is formed at one side to provide an abrupt wall or shoulder 139 against which the clutch pin engages when rotating in one direction to rotate the eccentric, and may be beveled at its other side, as shown at 140, from the face of said hub to the bottom of the socket to permit the pin to gradually drop into said socket when the pin is brought opposite to said socket, and thereby permit the pin to gradually enter the socket. Preferably the straight or abrupt side of the socket is formed on a separate hardened piece 141 suitably fixed to the hub to avoid direct wear of the pin on the material of the eccentric hub. The clutch pin is normally held in its retracted position, against the action of the spring 137, and with its outer end flush with the outer face of the disk 65, by means of a vertically movable clutch shoe 142. The said clutch shoe comprises a flat head 143 arranged between the guide flange 71 of the eccentric and the disk 65, and a depending stem 144 which guidingly engages at its lower end an apertured bracket 145 that is bolted or otherwise fixed to the upper member of the throat piece. The said eccentric shoe is formed with a curved upper margin 150 which bears against the periphery of the hub 72 and is held in this position, when unrestrained by means of a spiral expansively acting spring 151 interposed between a shoulder on the stem 144 and the guide bracket 145. The shoe is also provided on its inner side, or its side adjacent to the clutch pin, with an upper curved beveled surface 152 that is adapted to engage a correspondingly beveled end surface 153 of the clutch pin at one side of the axis of said pin in such manner that at a predetermined period in the rotation of the disk and eccentric clutched thereto, the advance or thinner margin of the beveled portion of the shoe will engage the beveled end surface 153 of the pin, and thereby throw or force the pin inwardly out of engagement with the socket 136 and thereby disconnect the shaft from the pitman operating eccentric. The shoe is shown in Figs. 4 and 5 in its uppermost position, or the position in which it holds the clutch pin retracted and the tool actuating pitman disconnected from its driving power. When the shaft is to be clutched to the disk the shoe 142 is depressed sufficiently to permit the clutch pin to pass over the same into the clutch socket 136, and after such engagement occurs the clutch pin will remain in said socket (bearing at its end against the inner face of the eccentric hub) during a complete rotation of the drive shaft and a cycle of movement of the tool. When the beveled end portion 153 of the pin again strikes the beveled or cam surface 152 of the shoe 142, which latter has in the meantime been raised by its spring 151, the clutch pin will be retracted from the clutch notch of the eccentric to disconnect the drive shaft from the eccentric.

The means herein shown for depressing the clutch shoe to effect the clutching of the drive shaft to the eccentric are made as follows: 155 designates a fork arm which is fixed to a horizontal rock shaft 156 which has bearing in the forward end of the upper member of the throat piece 31. The arms of said fork extend on opposite sides of the shoe below the head thereof, and are notched to engage oppositely extending pins 157 on the shoe below the head thereof. The said throat piece is cut away to provide a recess 158 to receive said fork arm. When said arm is rocked downwardly, it retracts the shoe from the clutch pin to permit the engagement of the clutch pin with the socket of the eccentric. The rock-shaft 156 may be actuated either by hand or foot power, or by both, to rock the fork arm 155 downwardly. Both methods of actuating the rock-shaft are herein shown and will now be described. The said rock shaft 156 is provided at one end, outside the machine frame (the right side thereof as shown) with a downwardly extending crank arm 162 that is connected by a rearwardly extending link 163 with one arm of a lever 164 that is pivoted to a stud 165 mounted in the side plate of the machine in rear of the throat opening. The other arm of said lever is connected by a forwardly extending link 167 with an arm 168 of a foot lever or treadle 169 that is pivoted at 170 at the lower, front side of the machine frame. By pressing the foot lever or treadle downwardly therefore, the fork arm 155 will be swung downwardly and withdraw the clutch shoe away from the clutch pin. In the usual operation of the machine the tool is intermittently actuated, and the withdrawal of the clutch shoe is effected after the work has been centered, and upon the retraction of the tool from the material the clutch pin is tripped out of connection with the pitman actuating eccentric so as to give time for again centering the material, before the tool again descends to its work. In some cases, however, it is desirable to operate the tool continuously, and in such event it is necessary to provide means for locking the clutch shoe in its lowermost position so as not to disconnect the drive shaft from the eccentric at the end of the retractive movement of the tool. A practical form of such locking device is made as follows: Fixed to said rock shaft 156 is an upwardly extending arm 172 which is provided with a hand piece 173 (Fig. 12) that is provided with a pin 174 which extends through a sleeve 175 at the upper end of said arm 172. A spring 176 surrounds said pin in said sleeve and is interposed between a shoulder on the pin and a shoulder on said sleeve 175 and tends to project said pin 174 inwardly beyond the arm 172 for engagement at its inner end with a socket 177 formed in the side of the tool head. The adjacent ends of the sleeve 175 and the hand piece 173 are formed with cam surfaces 180 and 181, so arranged that when the handle is rotated in one direction the cam surfaces act to retract the pin 174 from its socket, against the action of the spring 176 and to lock the pin in its retracted position. When the hand piece is turned in the other direction, the pin 174 is projected inwardly to engage said socket 17 through the action of its spring 176. When the punch is to be operated intermittently, the said pin 174 is retracted and locked in its retracted position, and in these positions of the parts the arm 172 and the parts carried thereby, will have no effect on the operation of the machine. When it is desired to operate the machine continuously however, and without interruption to center the work, the arm 172 is thrown over to retract the clutch shoe, and its pin 174 is engaged with the socket 177 to lock the clutch in operative position. It will be furthermore observed that when the pin 174 is retracted, the clutch shoe may be operated through the medium of said hand piece 173 when desired. Furthermore, in deep throated machines, it may be desirable to provide means located at or near the rear end of the throat for operating the clutch tripping rock shaft 156. As herein shown (Fig. 7) the lever 164, constituting part of the clutch shoe tripping gear, is provided with a rigid arm 180 that has a hand piece 181 by which the said tripping gear may be operated by a person standing at one side of the frame. This arrangement enables the clutch to be operated when the material is of such a character and dimensions as to render the use of the foot lever or treadle 169 inaccessible or inconvenient.

In order to arrest the rotative movement of the eccentric 66 and the parts carried thereby, under the impulse of momentum, when the eccentric is unclutched from the disk 65, I may provide the curved part of the shoe 142 that rides on the periphery of the hub of the eccentric with a stop pin 186 that is designed to engage a notch in said periphery just after the clutch pin has been released from the eccentric by the clutch shoe. The said pin is withdrawn from its notch when the shoe is depressed to effect the clutching operation of the clutch pin and is pressed upwardly against the periphery of the hub by the clutch shoe spring in readiness to drop into said notch at the completion of the rotation of the eccentric. The pin is made so short, relatively to the width of the cam portions of the shoe and clutch pin, as to not interfere with the cam action of the shoe on the pin and is not brought into action to arrest the eccentric until after the clutch pin is entirely free from the eccentric. Other forms of stop or brake devices may be employed to effect this result.

In Fig. 7 I have shown means for actuating the centering carriage by foot power. In this construction there is provided at the left hand side of the machine a foot lever or treadle 190 that is connected by a link 191 with the lower arm of a lever 192 mounted on a shaft 193 which extends transversely through the machine frame in rear of the throat. The upper arm of said lever is connected by a link 195 with the arm 196 of a gear sector 197 that is pivoted to a stud 198 on the side of the frame adjacent to one end of the centering pinion shaft 87. The teeth of said sector 197 meshes with a pinion 200 that is fixed to the left hand end of the centering pinion shaft 87 just outside the adjacent rack meshing pinion 86. With this construction it will be obvious that the rack may be lowered by the application of power to the foot lever or treadle 190. It will be furthermore observed that the clutch shoe actuating foot lever is located on one side of the machine and the centering foot lever on the other side thereof.

In some cases, and especially in deep throated machines neither the foot lever 190 nor the hand wheel 88 may be conveniently accessible for the purpose of operating tool centering carriage. In such case I may extend the shaft 193 through the machine frame to the right hand side of the machine and fix thereto a crank arm 201 having a hand piece 202 by which the centering sector may be actuated. In the latter construction the lever 164, constituting the part of the clutch shoe tripping gear, may be mounted on the extended end of said shaft 193. It will be observed that the arrangement of the levers and crank arms 180 and 201 last mentioned permits both the tool centering and clutch actuating operations to be effected from a single position of the operator standing at the rear of the throat. This arrangement is especially useful when operating on material of such large dimensions as to render the controlling devices at the front of the machine inaccessible or inconvenient.

While I have described the illustrated embodiment of my invention with considerable particularity, it will be understood that the illustrated details may be considerably varied within the scope of my invention, and the invention is not limited to such details except as such details are hereinafter made the subject of specific claims.

I claim as my invention:

1. In a machine for the purpose set forth, a frame composed of side plates and an intermediate filler which fills the space between the side plates, with means piercing said plates and filler to fix the same rigidly together, the plates being cut away from the margins thereof at one side edge of the frame to constitute a throat which opens to said side edge, and the filler embracing a cast metal throat piece formed with members which are arranged above and below the throat and extends to said side edge of the frame, with the members thereof separated at said side edge of the frame.

2. In a machine for the purpose set forth, a frame composed of side plates and an intermediate filler which fills the space between the side plates, with means piercing said plates and filler to fix the same rigidly together, the plates being cut away from the margins thereof at one side edge of the frame to constitute a throat which opens to said side edge, the filler embracing a cast metal throat piece formed with members which are arranged above and below the throat and extends to said side edge of the frame, with the members thereof separated at said side edge of the frame and a tool head between and attached rigidly to the plates of said side of the frame above the throat and having interlocking engagement with the upper member of the throat piece.

3. In a punching and shearing machine, a frame composed of side plates and intermediate filler pieces, the plates being cut away to provide a throat, and an integral cast metal throat piece filling the space between and fixed rigidly to said plates, said throat piece having general horse shoe shape and conforming at its inner margins to the margins in the plates around the throat.

4. In a punching and shearing machine, a frame composed of side plates and intermediate filler pieces, the plates being cut away to provide a throat, and an integral, cast metal throat piece filling the space between and fixed rigidly to said side plates, said cast metal throat piece having the general shape of a horse shoe which is thickened or made heaviest at its rear closed portion.

5. In a punching and shearing machine, a frame composed of side plates and intermediate filler pieces, the plates being cut away to provide a throat and an integral, cast metal horse shoe shaped throat piece filling the space between and fixed rigidly to said plates, said throat piece being provided at the forward end of its lower member with an integral depending portion fitted between the front marginal portions of said plates and arranged to constitute a support for a die holder.

6. In a punching and shearing machine, a frame composed of side plates and filler bars between and rigidly affixed to the top rear and bottom margins of the side plates, said plates being rearwardly cut away at the front of the frame to provide a throat, a cast metal throat piece of general horse shoe shape fitted between and fixed rigidly to the plates around the throat and a tool head fixed rigidly to the upper member of said throat piece and to the upper filler bar.

7. In a punching and shearing machine, a frame composed of side plates, filler bars between, and rigidly affixed to, the top rear and bottom margins of the side plates, said plates being rearwardly cut away at the front of the frame to provide a throat, a cast metal throat piece of general horse shoe shape fitted between and fixed rigidly to the plates around the throat and a tool head fixed rigidly to the upper member of said throat piece and to the upper filler bar, the lower member of said cast metal throat piece being provided at its forward end with an integral die supporting extension fitted between the forward margins of the plate and extending to the lower filler bar.

8. In a punching and shearing machine, a frame composed of side plates and intermediate filler pieces secured rigidly together and to the plates, the plates being cut away to provide a throat, a cast metal throat piece around the throat and filling the space between and fixed rigidly to the side plates, the upper member of the throat piece being provided with a bearing lug arranged to intermediately support the drive shaft of the machine.

9. In a punching and shearing machine, means for actuating the tool, means for centering the tool preliminary to its actuation and means operable at the end of the power stroke of the tool actuating means for positively connecting the tool to the actuating means to retract the tool.

10. In a punching and shearing machine, means for actuating the tool, means movable independently of the tool actuating means for centering the tool and means operable at the end of the power stroke of the tool actuating means for positively connecting the tool to the actuating means upon retraction of said actuating means.

11. In a punching and shearing machine, means for centering the tool, and tool actuating means, relatively to which the centering means is depressible, and arranged to act upon the centering means to actuate the tool, with means to connect the tool to its actuating means at the end of the power stroke of the latter to positively retract the tool.

12. In a punching and shearing machine, means for centering the tool, and to and fro actuated tool actuating means, relatively to which the centering means are depressible, and arranged to act on the centering means to actuate the tool, and means operable at the end of the power stroke of the actuating means for effecting positive connection between the tool centering and tool actuating means to retract the tool from its work.

13. In a punching and shearing machine, a tool carriage, means acting on the carriage for forcing the tool to its work, said carriage being movable toward the work independently of the tool actuating means to center the tool, and means operable at the end of the stroke of the tool actuating means for positively connecting the tool with its actuating means to retract the tool.

14. In a punching and shearing machine, a tool carriage, means acting on the carriage for forcing the tool to its work, said carriage being movable toward the work independently of the tool actuating means to center the tool, means for depressing the carriage to center the tool, and means operable at the end of the stroke of said actuating means for effecting a positive connection between the carriage and actuating means.

15. In a punching and shearing machine, a tool carriage, a tool operating pitman which acts on the carriage to press the tool to its work, said carriage being depressible relatively to said pitman to center the tool, means for depressing the carriage to so center the tool, and means for effecting a positive connection between the pitman and carriage at the end of the power stroke of the pitman.

16. In a punching and shearing machine, the combination with a tool head, of a tool carriage slidable in the head toward and from the work, a pitman mounted in said head and acting on the carriage to press the tool toward the work, said carriage being movable toward the work relatively to the pitman to center the tool, and means for counter-balancing the weight of the carriage operating normally to hold the carriage up against the pitman.

17. In a punching and shearing machine, the combination with a tool head, of a tool carriage slidable in the head toward and from the work, a pitman mounted in said head and acting on the carriage to press the tool toward the work, said carriage being movable toward the work relatively to the pitman to center the tool, and a spring for counter-balancing the weight of the carriage and against the action of which the carriage is moved toward the work.

18. In a punching and shearing machine, the combination with a tool head, of a tool carriage slidable in the head toward and from the work, a pitman mounted in said head and acting on the carriage to press the tool toward the work, said carriage being movable toward the work relatively to the pitman to center the tool, a stea mextending upwardly from and attached to the carriage and provided at its upper end with a head, and a counter-balancing spring interposed between said stem head and an upwardly facing surface on the tool head.

19. In a punching and shearing machine, the combination with a tool head, of a tool carriage vertically movable in said head, a tool operating pitman mounted in said head and provided at its lower end with a loosely fitting shoe, the carriage being provided with a recess to receive said shoe, and the carriage being depressible relatively to the shoe to center the tool.

20. In a punching and shearing machine, the combination with a tool head, a carriage, said carriage comprising a lower transverse member having a socket to receive the shank of a tool and side members which slide in vertical ways in said head, the lower transverse carriage being provided with an upwardly opening recess, and a tool operating pitman mounted in the head and provided at its lower end with a loosely fitted shoe that is slidable in said recess, whereby the carriage is vertically movable relatively to the pitman.

21. In a punching and shearing machine, a tool carriage, a tool operating pitman which acts on the carriage to press the tool to its work, said carriage being depressible relatively to said pitman to center the tool, and means for depressing the carriage to center the tool, comprising a rack on the carriage and a rotative shaft provided with a pinion engaging said rack.

22. In a punching and shearing machine, a tool carriage, a tool operating pitman which acts on the carriage to press the tool to its work, said carriage being depressible relatively to said pitman to center the tool, and means for depressing the carriage to center the tool, comprising a rack on the carriage, a rotative shaft provided with a pinion engaging said rack, a hand wheel on the shaft for rotating the latter to depress the carriage, means whereby said hand wheel is normally loose on the shaft and means for interlocking it therewith to rotate the shaft.

23. In a punching and shearing machine, the combination with a tool head, of a tool carriage slidable vertically in ways in said head, tool operating mechanism mounted in said head and acting on the carriage to press the tool to its work, a rack on the carriage, a shaft rotatively mounted in the tool head and provided with a pinion engaging the rack, said carriage being vertically movable relatively to the tool operating mechanism to center the tool, a hand wheel loosely mounted on said shaft, clutching means arranged to lock the wheel to said shaft and a spring operating normally to disconnect said clutching means.

24. In a punching and shearing machine, the combination with a tool head, a tool carriage slidable vertically in ways in said head, a tool operating device mounted in said head and acting through the carriage to press the tool to its work, the carriage being depressible relatively to the tool actuating means to center the tool, a foot lever or treadle and an operating gear between the foot lever or treadle and carriage for so depressing the carriage.

25. In a punching and shearing machine, the combination with a tool head, a tool carriage slidable vertically in ways in said head, a tool operating device mounted in said head and acting through the carriage to press the tool to its work, the carriage being depressible relatively to the tool actuating means to center the tool, means for so depressing the carriage embracing a foot lever and a manually operable device connected to and adapted to independently operate the depressing means.

26. In a punching and shearing machine, the combination with a tool head, a tool carriage slidable vertically in ways in said head, a tool operating device mounted in said head and acting through the carriage to press the tool to its work, the carriage being depressible relatively to the tool actuating means to center the tool, a rack on said carriage, a rotative shaft provided with a pinion meshing with said rack, a gear sector meshing with a pinion on said shaft to rotate the same and a pivoted foot lever or treadle operatively connected with said gear sector.

27. In a punching and shearing machine, the combination with a fixed head, a tool carriage slidable vertically in ways in said head, means acting on the carriage to press the tool to its work, said carriage being depressible relatively to the tool actuating means, a rack on the carriage, a shaft rotatively mounted in said tool head and provided with a pinion engaging said rack, a gear sector pivoted to the tool head and meshing with a pinion on said shaft, a pivoted foot lever or treadle, and link and lever connections between said sector and foot lever provided with a hand piece for manually operating said sector.

28. A punching machine comprising a frame provided at its end with a forwardly opening throat, a tool carriage over the throat slidable in ways in said frame, means for actuating the carriage to press the tool to its work, the carriage being depressible, relatively to the tool actuating means, to center the tool, means for so depressing the carriage, embracing a pivoted gear sector at the left hand side of the machine, a rock shaft mounted transversely in the frame in rear of the throat and provided on its right hand side with a crank arm and on the left hand side of the frame with a lever arm and a connection between said lever arm and said gear sector.

29. A punching machine comprising a frame provided with a forwardly opening throat, a tool carriage at the front of the frame over the throat and slidable in ways in said frame, actuating means for the carriage to depress the tool to its work, the carriage being depressible relatively to the tool actuating means to center the tool, means for so depressing the carriage, embracing a pivoted gear sector at the left hand side of the machine, a rock shaft mounted transversely in the frame in rear of the throat, a lever fixed to said rock shaft at the left hand side of the machine, a connection between said lever and said pivoted gear sector, a foot treadle at the forward end of the machine connected also to said lever and a hand actuated device on said rock shaft at the right hand side of the machine frame.

30. In a punching and shearing machine, the combination with a fixed head, a tool carriage slidable vertically in ways in said head, means acting on the carriage to press the tool to its work, said carriage being depressible relatively to the tool actuating means, a rack on the carriage, a shaft rotatively mounted in said tool head and provided with a pinion engaging said rack, a foot lever operatively connected to said shaft for depressing said carriage to center the tool, and a hand device normally loose on said shaft and adapted to be locked thereto to rotate said shaft to center the tool.

31. In a punching and shearing machine, means for centering the tool, actuating means, relatively to which the centering means is depressible, acting on the centering means to depress the tool to its work and means for effecting a positive connection between the actuating and centering means upon the retraction of the tool to positively strip the tool from its work.

32. In a punching and shearing machine, a tool carriage, a pitman acting on the carriage for depressing the tool, said carriage being depressible relatively to the pitman to center the tool, and means for effecting a positive connection between the pitman and carriage at the end of the power stroke of the pitman to positively strip the tool from its work in the retractive movement of the pitman.

33. In a punching and shearing machine, a tool carriage, a pitman acting on the carriage for depressing the tool to its work, said carriage being depressible relatively to the pitman to center the tool, means for effecting a positive connection between the carriage and pitman at the end of the power stroke of the pitman, and means operating at the end of the retreating stroke of the pitman to disconnect the pitman from the carriage.

34. In a punching and shearing machine, a tool carriage, a pitman acting on the carriage for depressing the tool to its work, said carriage being depressible relatively to the pitman to center the tool, a pin slidable in said pitman and adapted to be interlocked with the carriage at the end of the power stroke of the pitman to lock the pitman to the carriage to raise the carriage in the retreating stroke of the pitman, and means operating at the end of the retreating stroke of the pitman for disengaging the pin from said carriage.

35. In a punching and shearing machine, the combination with a tool head, of a tool carriage slidable in the head, a pitman mounted in the head and acting on the carriage for depressing the tool to its work, said carriage being depressible relatively to the pitman to center the work, a pin slidable in said pitman, the carriage being provided with a socket adapted to receive the pin for effecting connection of the carriage with the pitman, and a tripping device fixed to the head and the pin for retracting the pin from said socket.

36. In a punching and shearing machine, the combination with a tool head, of a tool carriage slidable in the head, a pitman acting on the carriage for depressing the tool to its work, said carriage being provided with an upwardly opening recess and the pitman being provided at its lower end with a shoe which is vertically slidable in said recess, a pin transversely slidable in the lower end of the pitman, said carriage being provided at one side of said recess with a socket adapted to receive one end of the pin to effect an interlocking connection of the pitman with the carriage and a tripping device fixed to the tool head adapted to engage the pin to retract it from said socket.

37. In a punching and shearing machine, the combination with a tool head, of a tool carriage slidable in the head, a pitman acting on the carriage for depressing the tool to its work, said carriage being provided with an upwardly opening recess and the pitman being provided at its lower end with a shoe which is vertically slidable in said recess, a pin transversely slidable in the lower end of the pitman, said carriage being provided at one side of said recess with a socket adapted to receive one end of the pin to effect an interlocking connection of the pitman with the carriage, and a plate fixed to the tool head at the other side of said socket and provided with a notch to receive one end of the pin, said latter plate and the pin being provided with inclined or cam surfaces to effect the withdrawal of the pin from said socket.

38. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric and a clutch mechanism for connecting said disk with said eccentric.

39. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, a spring pressed clutch pin slidable in said disk, the eccentric being provided with a socket to receive the pin, a clutch shoe operating to normally hold the clutch pin out of engagement with the socket and means for retracting the clutch shoe to permit the pin to enter said socket.

40. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, a spring pressed clutch pin slidable in said disk, the eccentric being provided with a socket to receive the pin, a clutch shoe operating to normally hold the clutch pin out of engagement with the socket, a foot lever pivoted to the side of the frame at the front end thereof and operative connection between said foot lever and clutch shoe.

41. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, a spring pressed clutch pin slidable in said disk, the eccentric being provided with a socket to receive the pin, a clutch shoe operating to normally hold the clutch pin out of engagement with the socket and means for retracting the clutch shoe to permit the pin to enter said socket, comprising a rock shaft provided with an arm which is loosely connected with said shoe, a second arm on said rock shaft, an intermediate lever connected by a link to said second arm of the rock shaft and a foot lever connected to said intermediate lever.

42. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, a spring pressed clutch pin slidable in said disk, the eccentric being provided with a socket to receive the pin, a clutch shoe operating to normally hold the clutch pin out of engagement with the socket and means for retracting the clutch shoe to permit the pin to enter said socket, comprising a rock shaft provided with an arm which is loosely connected with said shoe, a second arm on said rock shaft, an intermediate lever connected by a link to said second arm of the rock shaft, a foot lever connected with said intermediate lever, and a hand piece on said intermediate lever for operating the clutch shoe.

43. In a punching and shearing machine, the combination with a frame having a forwardly opening throat, a tool carriage slidable in the frame above the throat, means for actuating said carriage, a power device, clutch mechanism for connecting power to and disconnecting it from the carriage actuating means, a hand device at the front of the machine frame for controlling said clutch mechanism, and a second hand device operatively connected with the first hand device and with said clutch mechanism for operating the latter.

44. In a punching and shearing machine, the combination with a frame having a forwardly opening throat, a tool carriage slidable in the frame above the throat, means for actuating said carriage, a power device, clutch mechanism for connecting power to and disconnecting it from the carriage actuating means, a hand device at the front of the machine frame for controlling said clutch mechanism, a second hand device operatively connected with the first hand device and with said clutch mechanism for operating the latter, and means associated with the first hand device for locking the clutch in operative position for continuous reciprocation of the carriage.

45. In a punching and shearing machine, the combination with a frame having a forwardly opening throat, a tool carriage slidable in the frame above the throat, means for actuating said carriage, a power device clutch mechanism for connecting power to and disconnecting it from the carriage actuating means, controlling means for the clutch mechanism and a foot actuable and a hand actuable device connected to and adapted to operate said controlling means.

46. In a punching and shearing machine, the combination with a frame having a forwardly opening throat, a tool carriage slidable in the frame above the throat, means for actuating said carriage, a power device clutch mechanism for connecting power to and disconnecting it from the carriage actuating means, controlling means for the clutch mechanism and a hand actuable and foot actuable device arranged to be actuated from a single position of the operator for operating said controlling means.

47. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, a clutch mechanism for connecting said disk with said eccentric, and controlling means for said clutch mechanism arranged to permit continuous reciprocation of the pitman.

48. In a punching and shearing machine, the combination with a frame provided at its front end with a tool head and a drive shaft rotatively mounted in said head, of a disk in said head fixed to said drive shaft, an eccentric loosely mounted on said drive shaft in said head, a tool actuating pitman operated by said eccentric, a spring pressed clutch pin slidable in said disk, the eccentric being provided with a socket adapted to receive the clutch pin, a clutch shoe operating normally to hold the clutch pin out of engagement with said socket, a rock shaft provided with an arm which is loosely mounted with said shoe for retracting the shoe from said clutch pin, a crank arm fixed to said rock shaft and connected with means for operating the shaft to retract the shoe and a second crank arm fixed to said rock shaft and provided with a hand piece for retracting said shoe.

49. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, a clutch mechanism for connecting said disk with said eccentric embracing a clutch shot and means for retracting said shoe and for holding the shoe in its retracted position.

50. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, a spring pressed clutch pin slidable in said disk, the eccentric being provided with a socket to receive the pin, a clutch shoe operating to normally hold the clutch pin out of engagement with the socket and means for retracting the clutch shoe to permit the pin to enter said socket, comprising a rock shaft provided with an arm which is loosely connected with said shoe, a second arm on said rock shaft connected with means for operating the shaft, a third arm on the rock shaft and a hand piece on said third arm for operating the clutch shoe, said hand piece being provided with a retractable locking pin adapted to engage a socket in the tool head to hold the shaft in a position to lock the clutch shoe in its retracted position.

51. In a punching and shearing machine, the combination with a frame provided at its front end with a tool head and a drive shaft rotatively mounted in said head, of a disk in said head fixed to said drive shaft, an eccentric in said head loosely mounted on said drive shaft, a tool actuating pitman operated by said eccentric, spring pressed clutch pin slidable in said disk, the eccentric being provided with a socket to receive the pin, a clutch shoe arranged between the eccentric and disk and provided with a cam surface adapted to engage the end of the pin to retract said pin from said eccentric socket, and means for retracting said clutch shoe from said pin.

52. In a punching and shearing machine, the combination with a frame provided with a tool head and a drive shaft rotatively mounted in said head, of a disk in said head fixed to the drive shaft, an eccentric in said head loosely mounted on the drive shaft and provided with a concentric hub adjacent to the disk and having a clutch socket, a spring pressed clutch pin slidable in the disk and adapted for engagement with said socket, a shoe arranged between said eccentric and the disk and provided with a curved bearing face adapted for engagement with the periphery of said hub, a spring acting normally to hold the shoe engaged with said hub, the said shoe being provided with a cam surface adapted to engage the clutch pin to retract it from the eccentric socket and means for retracting said clutch shoe from the clutch pin to permit the latter to enter said socket.

53. In a punching and shearing machine, the combination with a frame provided with a tool head and a drive shaft rotatively mounted in said head, of a disk in said head fixed to the drive shaft, an eccentric in said head loosely mounted on the drive shaft and provided with a concentric hub adjacent to the disk and having a clutch socket, a spring pressed clutch pin slidable in the disk and adapted for engagement with said socket, a shoe arranged between said eccentric and the disk and provided with a curved bearing face adapted for engagement with the periphery of said hub, a spring acting normally to hold the shoe engaged with said hub, the said shoe being provided with a cam surface adapted to engage the clutch pin to retract it from the eccentric socket, means for retracting said clutch shoe from the clutch pin to permit the latter to enter said socket, and a stop pin on the shoe adapted to enter a socket on the periphery of the hub for arresting the eccentric when unclutched from the disk.

54. In a punching and shearing machine, a tool carriage, a pitman operating on the carriage to press the tool to its work, the carriage being depressible relatively to the pitman for centering the tool, mechanism for so depressing the carriage, a drive shaft, an eccentric on the drive shaft, means for clutching the eccentric to the drive shaft, controlling means for said clutch, and manually operable devices at one side of the machine, operable from a single position of the operator, for operating the clutch controlling and tool carriage centering means.

55. In a punching or shearing machine, the combination with a frame having a forwardly opening throat, a tool carriage movable in the forward end of the frame over said throat, an operating shaft mounted in the frame, a carriage actuating device connected to the shaft to press the tool to its work, the carriage being depressible relatively to its actuating device to center the tool, a clutch device associated with said shaft for connecting power to and disconnecting it from the carriage actuating device, and hand actuable means at one side of the frame in rear of said throat for controlling the clutch device and for depressing said carriage to center the tool.

56. In a punching or shearing machine, the combination with a frame having a forwardly opening throat, a tool carriage movable in the forward end of the frame over said throat, an operating shaft mounted in the frame, a carriage actuating device connected to the shaft to press the tool to its work, the carriage being depressible relatively to its actuating device to center the tool, a clutch device associated with said shaft for connecting power to and disconnecting it from the carriage actuating device, hand actuable means at one side of the frame in rear of said throat for controlling the clutch device and for depressing said carriage to center the tool, and foot and hand actuable devices at the front of the machine and arranged to be actuated from a single position of an operator for controlling said clutch and for depressing said carriage for centering the tool.

57. In a punching and shearing machine, a tool carriage having means to actuate the same to depress the tool to its work, the carriage being movable relatively to its actuating means for centering the tool, a power device, a clutch for connecting the power device to and disconnecting it from the tool carriage actuating means, having means for controlling the same, and means at one side of the machine, operable from a single position of the operator for operating the clutch controlling and carriage centering means.

In testimony that I claim the foregoing as my invention I affix my signature in the presence of two witnesses, this 18th day of August, A. D. 1909.

HANS B. KRAUT.

Witnesses:
J. W. DITMAN,
GEO. ARMSTRONG.

Copies of this patent may be obtained for five cents each, by addressing the "Commissioner of Patents, Washington, D. C."